(12) United States Patent
Fink et al.

(10) Patent No.: US 9,990,043 B2
(45) Date of Patent: Jun. 5, 2018

(54) GESTURE RECOGNITION SYSTEMS AND DEVICES FOR LOW AND NO LIGHT CONDITIONS

(71) Applicants: Ryan Fink, Vancouver, WA (US); Ryan Phelps, Portland, OR (US); Gary Peck, Portland, OR (US)

(72) Inventors: Ryan Fink, Vancouver, WA (US); Ryan Phelps, Portland, OR (US); Gary Peck, Portland, OR (US)

(73) Assignee: Atheer Labs, Inc., Mountain View, CA (US)

( * ) Notice: Subject to any disclaimer, the term of this patent is extended or adjusted under 35 U.S.C. 154(b) by 0 days. days.

(21) Appl. No.: 14/789,788

(22) Filed: Jul. 1, 2015

(65) Prior Publication Data

US 2016/0011669 A1    Jan. 14, 2016

Related U.S. Application Data

(60) Provisional application No. 62/022,384, filed on Jul. 9, 2014.

(51) Int. Cl.
*G06F 3/01* (2006.01)

(52) U.S. Cl.
CPC ............. *G06F 3/017* (2013.01); *G06F 3/012* (2013.01)

(58) Field of Classification Search
CPC .......... G06F 3/017; G06F 3/011; G06F 3/012; H04N 5/33
USPC .......................................... 348/135; 382/118
See application file for complete search history.

(56) References Cited

U.S. PATENT DOCUMENTS

| | | | | |
|---|---|---|---|---|
| 7,027,621 B1* | 4/2006 | Prokoski | ............ | G06K 9/00255 180/272 |
| 9,202,105 B1* | 12/2015 | Wang | ................. | G06Q 20/4014 |
| 2007/0124694 A1* | 5/2007 | Van De Sluis | ......... | G06F 3/017 715/775 |
| 2012/0075463 A1* | 3/2012 | Chen | ...................... | G01S 11/12 348/135 |
| 2012/0146903 A1* | 6/2012 | Arihara | .................... | G06F 3/011 345/158 |
| 2012/0256967 A1* | 10/2012 | Baldwin | ................. | G06F 3/013 345/684 |
| 2013/0155255 A1* | 6/2013 | Yu | ...................... | H04N 5/23203 348/164 |
| 2013/0335573 A1* | 12/2013 | Forutanpour | ........... | G06F 3/011 348/158 |

(Continued)

*Primary Examiner* — Jennifer Mehmood
*Assistant Examiner* — James Nokham
(74) *Attorney, Agent, or Firm* — Mohr Intellectual Property Law Solutions, P.C.

(57) ABSTRACT

Gesture recognition systems for detecting gesture commands in light conditions and in dark conditions including a computing system having a processor and a thermographic camera configured to detect infrared radiation from a gesture made by a user and communicate gesture image information to the processor for carrying out a computer-readable gesture command are shown and described. In some examples, the computing system and the thermographic camera are supported on an eyewear article frame. In some other examples, the computing system and the thermographic camera are components of a mobile device. In even other examples, the computing system and the thermographic camera are components of a desk top computer or a laptop computer.

18 Claims, 5 Drawing Sheets

(56) References Cited

U.S. PATENT DOCUMENTS

2014/0249689 A1* 9/2014 Bienkowski ............ G06F 3/017
                                                                          700/299

\* cited by examiner

GESTURE RECOGNITION SYSTEMS AND DEVICES FOR LOW AND NO LIGHT CONDITIONS

CROSS REFERENCE TO RELATED APPLICATIONS

This application claims priority to and the benefit under 35 U.S.C. § 119(e) of U.S. Provisional Patent Application, Ser. No. 62/022,384, filed on Jul. 9, 2014, which is hereby incorporated by reference for all purposes.

BACKGROUND

The present disclosure relates generally to systems and devices for gesture recognition. In particular, systems and devices using infrared cameras that are capable of gesture recognition in "normal light", "low light" and/or "no light" conditions are described.

Gesture recognition is a rapidly growing technological field for inputting commands to computer systems, gaming systems, and/or other interactive control systems. In such systems, human gestures are captured by image and/or motion detection subsystems and interpreted via algorithms to relay specific commands to the subject system. Gestures can originate from any bodily motion or state, but commonly originate from the face or hand of a user.

Known gesture recognition devices and systems are not entirely satisfactory for the range of applications in which they are employed. For example, existing gesture recognition devices and systems rely on light sensing cameras to perform gesture recognition. Therefore, in "low light" conditions a gesture may be incompletely and/or incorrectly detected and result in an incorrect command interpretation. Additionally or alternatively, in "no light" conditions, a gesture may be entirely undetected and no command interpretation processed by the system.

Thus, there exists a need for gesture recognition systems and devices that improve upon and advance the design of known gesture recognition systems and devices. Examples of new and useful gesture recognition systems and devices relevant to the needs existing in the field are discussed below.

SUMMARY

The present disclosure is directed to gesture recognition systems for detecting gesture commands in light conditions and in dark conditions. The described gesture recognition systems each include a computing system having a processor and a thermographic camera configured to detect infrared radiation from a gesture made by a user and communicate gesture image information to the processor for carrying out a computer-readable gesture command. In some examples, the computing system and the thermographic camera are supported on an eyewear article frame. In some other examples, the computing system and the thermographic camera are components of a mobile device. In even other examples, the computing system and the thermographic camera are components of one or more of a desk top computer and a laptop computer.

DETAILED DESCRIPTION

Figure 1:
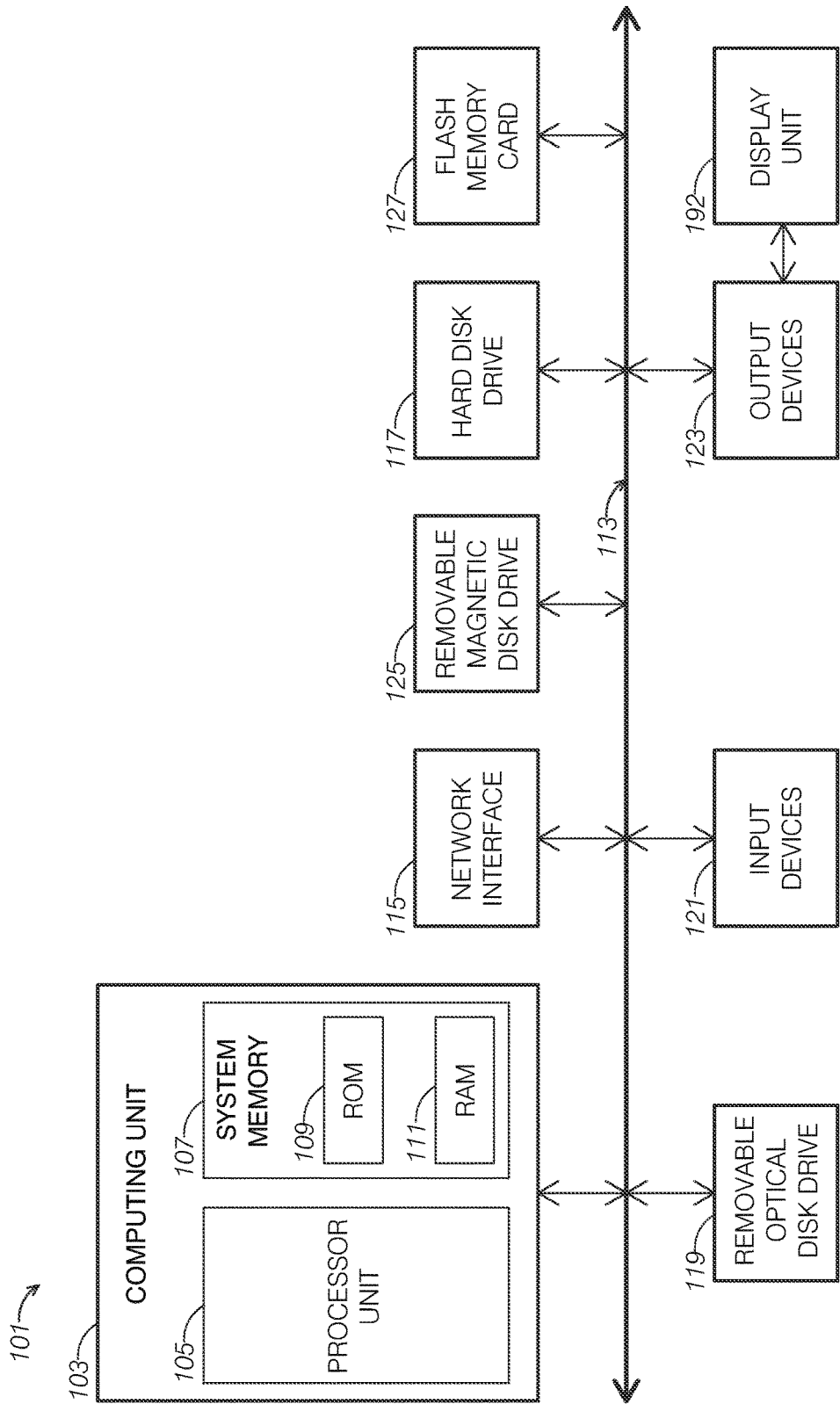
FIG. 1 shows a schematic view of an example of a programmable computing device.

The disclosed gesture recognition systems and devices using infrared (IR) cameras will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, a variety of gesture recognition systems and devices using IR cameras examples are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-5 examples of gesture recognition systems using an infrared (IR) camera, gesture recognition systems 300, 400 and 500, will now be described. TIhe presently described gesture recognition systems and devices function to detect and interpret gesture commands performed in "low-light" and/or "no light" conditions. Additionally or alternatively, the presently described gesture recognition systems and devices can be used to detect and interpret gesture commands performed in "normal light" conditions.

The presently described gesture recognition systems and devices address many of the shortcomings existing with conventional gesture recognition systems. For example, using the gesture recognition systems of the present application, a gesture command made by a user can be detected and interpreted in "low light" conditions where conventional systems might provide incomplete detection and/or misinterpret the gesture, resulting in an incorrect command. In another example, a gesture command made by a user in "no light" conditions can be detected and interpreted where conventional systems would not be able to detect the gesture, resulting in no command being processed by the system.

It will be appreciated that various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

Accordingly, FIG. 1 shows one illustrative example of a computer, computer 101, which can be used to implement various embodiments of the invention. Computer 101 may be incorporated within a variety of consumer electronic devices, such as personal media players, cellular phones, smart phones, personal data assistants, global positioning system devices, smart eyewear, and the like.

As seen in this figure, computer 101 has a computing unit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RLM) 111. As will be appreciated by those of ordinary skill in the art, both read-only memory (ROM) 109 and random access memory (RLM) 111 may store software instructions to be executed by processing unit 105.

Processing unit 105 and system memory 107 are connected, either directly or indirectly, through a bus 113 or alternate communication structure to one or more peripheral devices. For example, processing unit 105 or system memory 107 may be directly or indirectly connected to additional memory storage, such as a hard disk drive 117, a removable optical disk drive 119, a removable magnetic disk drive 125, and a flash memory card 127. Processing unit 105 and system memory 107 also may be directly or indirectly connected to one or more input devices 121 and one or more output devices 123.

Output devices 123 may include, for example, a monitor display, an integrated display, television, printer, stereo, or speakers. Input devices 121 may include, for example, a keyboard, touch screen, a remote control pad, a pointing device (such as a mouse, touchpad, stylus, trackball, or joystick), a scanner, a microphone, or a camera.

More specifically, in the presently described gesture recognition systems, input devices 121 include at least an IR camera 122 (i.e., thermographic camera). A thermographic camera is a device that forms an image using infrared radiation, similar to a common camera that forms an image using visible light. Instead of the 450-750 nanometer range of the visible light camera, infrared cameras operate in wavelengths as long as 14,000 nm (14 μm). Infrared energy is one portion of the electromagnetic spectrum and all objects emit a certain amount of black body radiation as a function of their temperatures.

Generally speaking, the higher an object's temperature, the more infrared radiation emitted as black-body radiation. A thermographic camera can detect this radiation in a way similar to the way an ordinary camera detects visible light. A thermographic camera works even in total darkness because ambient light level does not contribute to image capture. This makes thermographic cameras useful for gesture recognition in "low light" and "no light" conditions. Generally, the brightest (warmest) parts of the image are colored white, intermediate temperatures are gray, and the dimmest (coolest) parts black. Resolution may be lower than for optical cameras (e.g., 160×120 or 320×240 pixels).

IR camera 122 can include cooled infrared photodetectors (e.g. indium antimonide, indium arsenide, mercury cadmium telluride, lead sulfide, lead selenide, etc.) and/or uncooled infrared photodetectors (e.g., vanadium oxide, lanthanum barium manganite, amorphous silicon, lead zirconate titanate, lanthanum doped lead zirconate titanate, lead scandium tantalate, lean lanthanum titanate, lead titanate, lead zinc niobate, lead strontium titanate, barium strontium titanate, antimony sulfoiodide, polyvinylidene difluoride, etc.). Further, it will be appreciated that IR camera 122 can be any known or yet to be discovered thermographic camera.

Returning to FIG. 1, computing unit 103 can be directly or indirectly connected to one or more network interfaces 115 for communicating with a network. This type of network interface 115, also sometimes referred to as a network adapter or network interface card (NIC), translates data and control signals from computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that may perform input, output and storage tinctions, or some combination thereof. For example, the computer 101 may be connected to a digital music player, such as an IPOD® brand digital music player or iOS or Android based smartphone. As known in the art, this type of digital music player can serve as both an output device for a computer (e.g., outputting music from a sound file or pictures from an image file) and a storage device.

In addition to a digital music player, computer 101 may be connected to or otherwise include one or more other peripheral devices. In one example, computer 101 may be connected to or otherwise include a telephone. The telephone may be, for example, a wireless "smart phone," such as those featuring the Android or iOS operating systems. As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computer 101 so that their data maintained may be synchronized.

Figure 3:
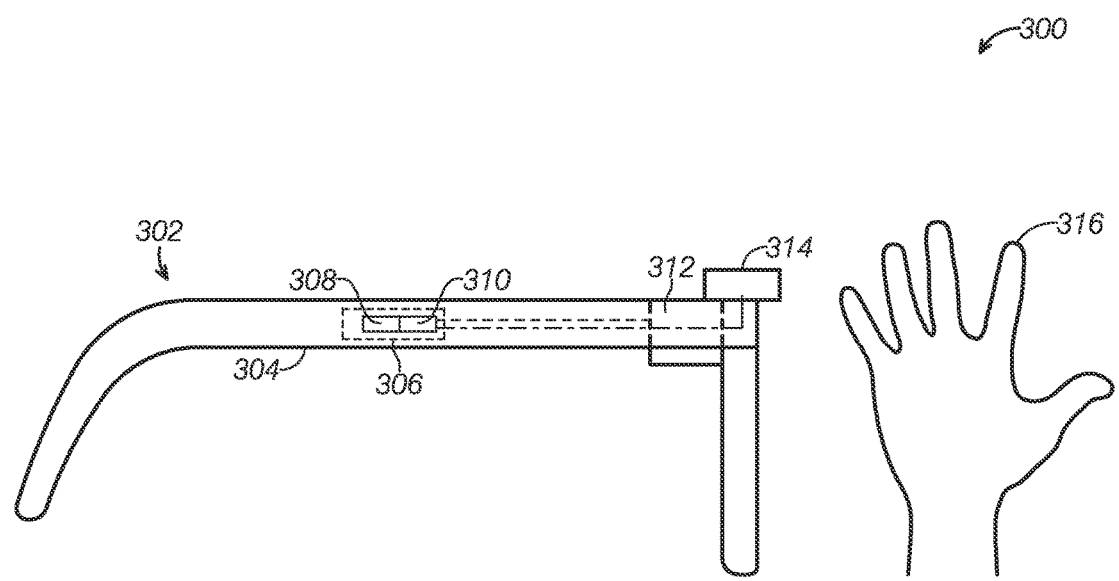
FIG. 3 is a schematic view of a first example of a gesture recognition system

In another example, computer 101 may be connected to or otherwise include an eyewear article (such as eyewear article 302 shown in FIG. 3). The eyewear article may be, for example, a "smart" eyewear article, such as wearable computing devices like Google® Glass.

The "smart" eyewear technologies are particularly suited to the display of "augmented reality" displays. "Augmented reality" displays comprise a computer generated graphical display laid over a portion of a user's or mobile device's natural field of vision. These "augmented reality" displays allow a user to view computer generated images including data related to objects in their natural field of vision.

Augmented reality displays may include any display including both natural and computer generated elements.

Of course, still other peripheral devices may be included with or otherwise connected to a computer 101 of the type illustrated in FIG. 1, as is well known in the art. In some cases, a peripheral device may be permanently or semi-permanently connected to computing unit 103. For example, with many computers, computing unit 103, hard disk drive 117, removable optical disk drive 119 and a display are semi-permanently encased in a single housing.

Still other peripheral devices may be removably connected to computer 101, however. Computer 101 may include, for example, one or more communication ports through which a peripheral device can be connected to computing unit 103 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computer 101 may include a wireless data "port," such as a Bluetooth® interface, a Wi-Fi interface, an infrared data port, or the like.

It will be appreciated that a computing device employed according various examples of the invention may include more components than computer 101 illustrated in FIG. 1, fewer components than computer 101, or a different combination of components than computer 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

In many examples, computers may define mobile electronic devices, such as smart phones, smart glasses, tablet computers, or portable music players, often operating the iOS, Symbian, Windows-based (including Windows Mobile and Windows 8), or Android operating systems.

Figure 2:
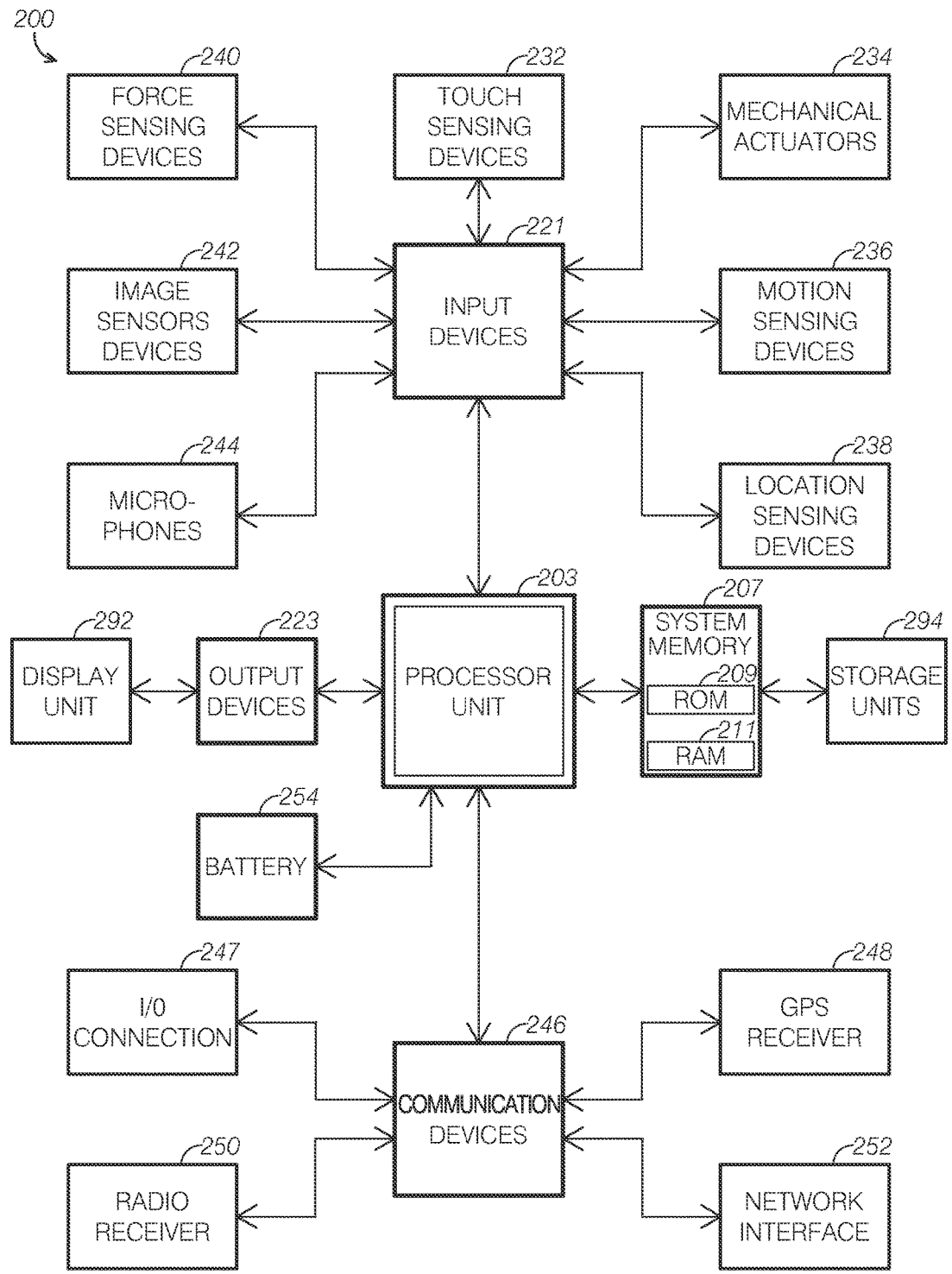
FIG. 2 shows a schematic view of an example of a mobile electronic device.

With reference to FIG. 2, an exemplary mobile device, mobile device 200, may include a processor unit 203 (e.g., CPU) configured to execute instructions and to carry out operations associated with the mobile device. For example, using instructions retrieved from memory, the controller may control the reception and manipulation of input and output data between components of the mobile device. The controller can be implemented on a single chip, multiple chips or multiple electrical components. For example, various architectures can be used for the controller, including dedicated or embedded processor, single purpose processor, controller, ASIC, etc. By way of example, the controller may include microprocessors, DSP, A/D converters, D/A converters, compression, decompression, etc.

In most cases, the controller together with an operating system operates to execute computer code and produce and use data. The operating system may correspond to well known operating systems such iOS, Symbian, Windows-based (including Windows Mobile and Windows 8), or Android operating systems, or alternatively to special purpose operating system, such as those used for limited purpose appliance-type devices. The operating system, other computer code and data may reside within a system memory 207 that is operatively coupled to the controller. System memory 207 generally provides a place to store computer code and data that are used by the mobile device. By way of example, system memory 207 may include read-only memory (ROM) 209, random-access memory (RAM) 211. Further, system memory 207 may retrieve data from storage units 294, which may include a hard disk drive, flash memory, etc. In conjunction with system memory 207, storage units 294 may include a removable storage device such as an optical disc player that receives and plays DVDs, or card slots for receiving mediums such as memory cards (or memory sticks).

Mobile device 200 also includes input devices 221 that are operatively coupled to processor unit 203. Input devices 221 are configured to transfer data from the outside world into mobile device 200. As shown, input devices 221 may correspond to both data entry mechanisms and data capture mechanisms. In particular, input devices 221 may include touch sensing devices 232 such as touch screens, touch pads and touch sensing surfaces, mechanical actuators 234 such as button or wheels or hold switches, motion sensing devices 236 such as accelerometers, location detecting devices 238 such as global positioning satellite receivers, WiFi based location detection functionality, or cellular radio based location detection functionality, force sensing devices 240 such as force sensitive displays and housings, image sensors 242 such as light cameras and/or IR cameras, and microphones 244. Input devices 221 may also include a clickable display actuator.

More specifically, in the presently described gesture recognition systems, input devices 221 include at least an IR camera 243 (one of image sensing devices 242). IR camera 243 is a thermographic camera such as those described above in reference to IR camera 122. Accordingly, IR camera 243 has the same functions and capabilities as those described above in reference to IR camera 122.

Returning to FIG. 2, mobile device 200 also includes various output devices 223 that are operatively coupled to processor unit 203. Output devices 233 are configured to transfer data from mobile device 200 to the outside world. Output devices 233 may include a display unit 292 such as an LCD, speakers or jacks, audio/tactile feedback devices, light indicators, and the like.

Mobile device 200 also includes various communication devices 246 that are operatively coupled to the controller. Communication devices 246 may, for example, include both an I/O connection 247 that may be wired or wirelessly connected to selected devices such as through IR, USB, or Firewire protocols, a global positioning satellite receiver 248, and a radio receiver 250 which may be configured to communicate over wireless phone and data connections. Communication devices 246 may also include a network interface 252 configured to communicate with a computer network through various means which may include wireless connectivity to a local wireless network, a wireless data connection to a cellular data network, a wired connection to a local or wide area computer network, or other suitable means for transmitting data over a computer network.

Mobile device 200 also includes a battery 254 and possibly a charging system. Battery 254 may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations of the invention described above can be used alone or in various combinations. The methods of this invention can be implemented by software, hardware or a combination of hardware and software. The invention can also be embodied as computer readable code on a computer readable medium (e.g. a non-transitory computer readable-storage medium). The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

Turning now to FIG. 3, a first example of a gesture recognition system, gesture recognition system 300, is shown implemented an eyewear article 302. Eyewear article 302 is a "smart" eyewear article, such as those described above in reference to FIGS. 1 and 2. Accordingly, eyewear article 302 includes a frame 304 for supporting a computing device 306 (i.e., computing system), such as computer 101, including at least a processor 308 and system memory 310 (i.e., a non-transitory computer-readable storage medium) in data communication with an image generator 312 and an IR camera 314. Image generator 312 is configured to display and/or project an image into the view of a user wearing eyewear article 302, creating an augmented reality view.

IR camera 314 can be any of the thermographic cameras described above in reference to IR camera 122. IR camera 314 is configured to detect a gesture 316 in "normal light", "low light", and/or "no light" conditions. Further, IR camera 314 is configured to detect infrared radiation from a gesture made by a user and communicate gesture image information to processor 308 for carrying out computer-readable gesture commands. In the present example, gesture 316 is an open hand gesture; however, it will be appreciated that IR camera 314 can detect a variety of other hand gestures (e.g., closed hand, swipe right, swipe left, swipe forward, swipe backward, etc.) and/or a variety of gestures (e.g., wink of eye, blink of eyes, head movements up, down, right, and/or left, etc.). It will be further appreciated that gesture 316 and/or any other gesture detected by IR camera 314 can be a gesture made by a user (i.e., a wearer of the eye wear article) or a gesture made by another person.

Figure 4A:
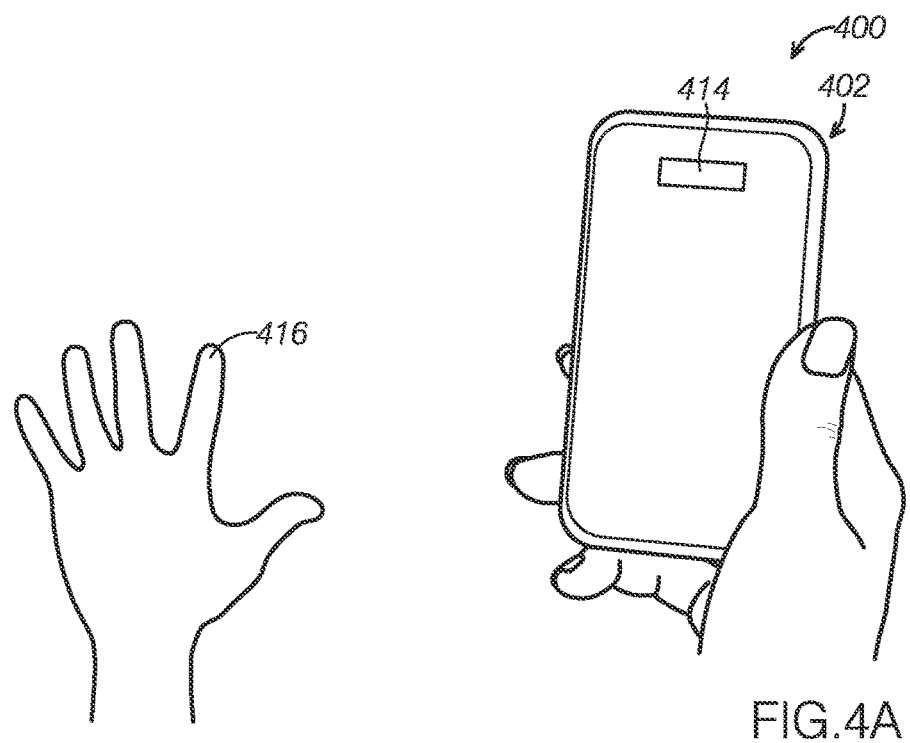
FIGS. 4A and 4B are schematic views of a second example of a gesture recognition system and a third example of the gesture recognition system, respectively.

Turning attention to FIG. 4A, a second example of a gesture recognition system, gesture recognition system 400, will now be described. Gesture recognitions system 400 includes many similar or identical features to gesture recognition system 300. Thus, for the sake of brevity, each feature of gesture recognition system 400 will not be redundantly explained. Rather, key distinctions between gesture recognition system 400 and gesture recognition system 300 will be described in detail and the reader should reference the discussion above for features substantially similar between the gesture recognition systems.

As can be seen in FIG. 4A, gesture recognition system 400 is implemented in a mobile device 402 including an IR camera 414 in data communication with a computer having a processor and system memory (not specifically shown) of the mobile device for detecting a gesture 416. In the present example, mobile device 402 is a smart phone. It will be appreciated that in other examples mobile device 402 can be any of the mobile devices described above in reference to mobile device 200 (shown in FIG. 2).

IR camera 414 can be any of the thermographic cameras described above in reference to IR camera 122. IR camera 414 is configured to detect a gesture 416 in "normal light", "low light", and/or "no light" conditions. In the present example, gesture 416 is an open hand gesture; however, it will be appreciated that IR camera 414 can detect a variety of other hand gestures (e.g., closed hand, swipe right, swipe left, swipe forward, swipe backward, etc.) and/or a variety of gestures (e.g., wink of eye, blink of eyes, head movements up, down, right, and/or left, etc.).

Figure 4B:
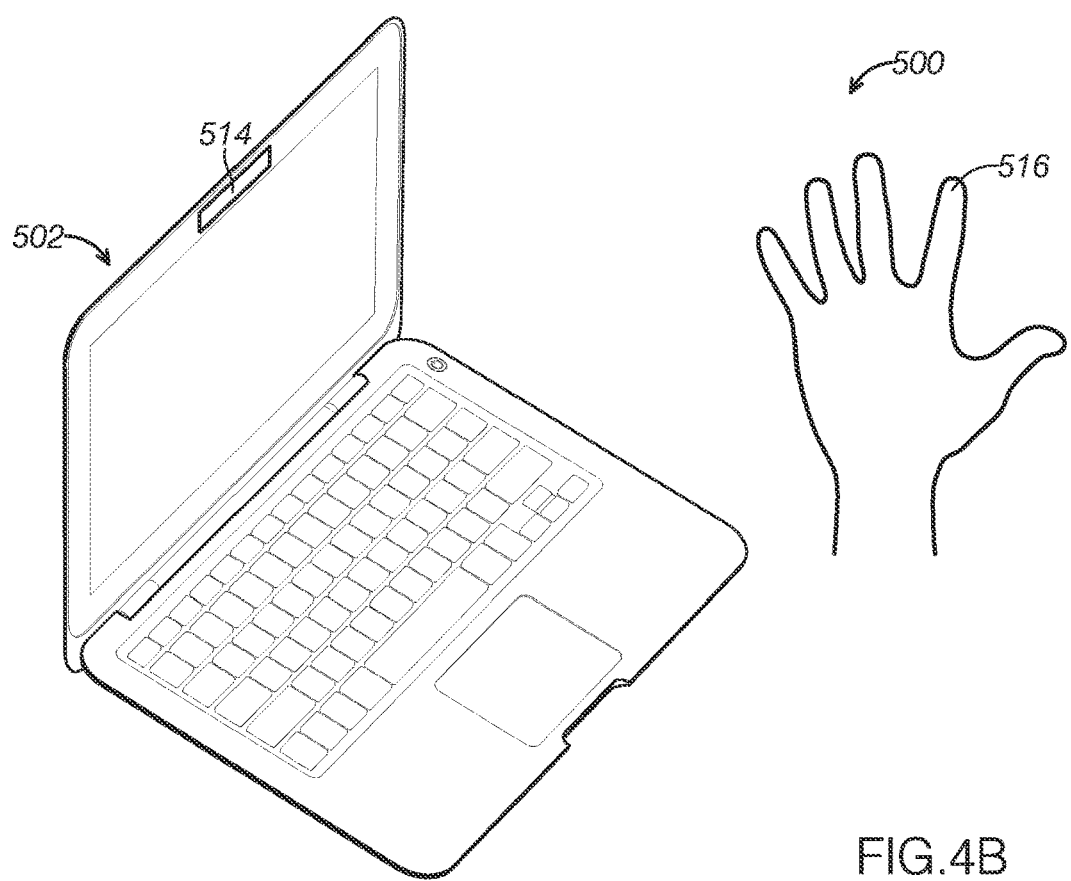

Turning attention to FIG. 4B, a third example of a gesture recognition system, gesture recognition system 500, will now be described. Gesture recognitions system 500 includes many similar or identical features to gesture recognition systems 300 and 400. Thus, for the sake of brevity, each feature of gesture recognition system 500 will not be redundantly explained. Rather, key distinctions between gesture recognition system 500 and gesture recognition systems 300 and 400 will be described in detail and the reader should reference the discussion above for features substantially similar between the gesture recognition systems.

As can be seen in FIG. 4B, gesture recognition system 500 is implemented in a computing device 502 including an IR camera 514 in data communication with a processor and system memory of the computer (not specifically shown) for detecting a gesture 516. In the present example, computer device 502 is a laptop computer. It will be appreciated that in other examples computing device 502 can be any of the mobile devices described above in reference to computer 101 (shown in FIG. 1).

IR camera 514 can be any of the thermographic cameras described above in reference to IR camera 122. IR camera 514 is configured to detect a gesture 516 in "normal light", "low light", and/or "no light" conditions. In the present example, gesture 516 is an open hand gesture: however, it will be appreciated that IR camera 514 can detect a variety of other hand gestures (e.g., closed hand, swipe right, swipe left, swipe forward, swipe backward, etc.) and/or a variety of gestures (e.g., wink of eye, blink of eyes, head movements up, down, right, and/or left, etc.).

Figure 5:
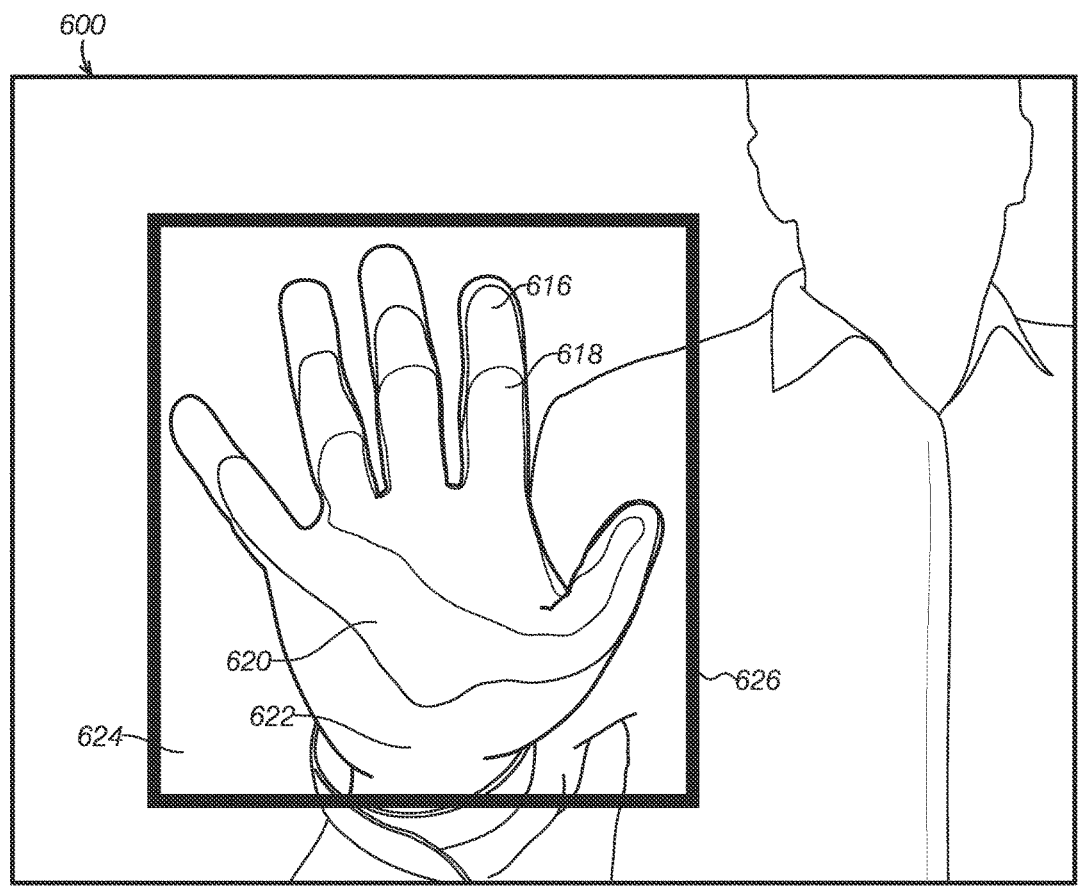
FIG. 5 is a front elevation view of an example camera view of an example hand gesture from any of the first, second, or third example gesture recognition systems.

Finally, FIG. 5 shows an example infrared image 600 as detected by an IR camera (e.g., IR cameras 122, 243, 314, 414, and 514). Infrared image 600 captures a thermographic image of a gesture 616. In the present example, gesture 616 is an open hand gesture; however, it will be appreciated that IR camera 614 can detect a variety of other hand gestures (e.g., closed hand, swipe right, swipe left, swipe forward, swipe backward, etc.) and/or a variety of gestures (e.g., wink of eye, blink of eyes, head movements up, down, right, and/or left, etc.).

As described above for infrared images, all objects emit a certain amount of black body radiation as a function of their temperatures and the higher an object's temperature, the more infrared radiation emitted as black-body radiation. Thus, infrared image 600 can be captured of a user's hand (i.e., gesture 616) in any of "normal light", "low light", and "no light" conditions for gesture recognition. In infrared image 600, the warmest (brightest) portions of the user's hand are colored white in zone 618, intermediate temperature portions are light gray in zone 620, and the coolest (dimmest) portions are dark gray in zone 622, while the background 624 is colored black. A readable zone 626 can be used to detect and/or define the location of the gesture to be read by the IR camera.

It will be appreciated that the system memory (i.e., non-transitory computer readable storage medium) of each of gesture recognition systems 300, 400, and 500 includes computer-readable instructions for operating the thermographic camera, receiving one or more thermographic images from the thermographic camera, analyzing the thermographic images to determine a gesture command, and executing the gesture command. In alternate examples, the system memory can include more or fewer computer-readable instructions.

Further, it will be appreciated that in alternate examples any of gesture recognition systems 300, 400, and 500 can additionally include other cameras, such as light cameras. In these examples, the thermographic cameras can be used for gesture detection in any of the "normal light", "low light", and/or "no light" conditions. Furthermore, the light cameras can be for gesture detection in "normal light" conditions. In some examples, the light cameras can additionally be used in "low light conditions". The light camera can be used alone or in combination with the thermographic camera. In some examples, the light camera can be used in "normal light" conditions, while the thermographic camera is alternately used in "low light" and/or "no light" conditions.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A system, comprising:
a thermographic camera having a first field of view, the thermographic camera to capture an infrared image within the first field of view;
an optical camera having a second field of view, the optical camera to detect an optical image, wherein the first field of view and the second field of view are substantially the same; and
a processor coupled to the thermographic camera, the processor to:
receive the infrared image from the thermographic camera;
receive the optical image from the optical camera;
determine whether a light condition of the optical image is a normal light condition, a low light condition, or a no light condition;
in response to the low light condition or the no light condition:
detect infrared radiation in the infrared image;
define a first readable zone within the infrared image, wherein the first readable zone is a portion of the first field of view that includes an image of a body part of a user;
identify a first gesture made by the user based on the infrared radiation within the first readable zone to obtain first gesture information; and
execute a first gesture recognition command associated with the first gesture information; and
in response to the normal light condition:
define a second readable zone within the optical image associated, wherein the second readable zone is a portion of the second field of view that includes the image of the body part of the user;
identify a second gesture made by the user within the second readable zone using optical recognition to obtain second gesture information; and
execute a second gesture recognition command associated with the second gesture information.

2. The system of claim 1, wherein the processor, the thermographic camera, and the optical camera are supported on an eyewear article frame.

3. The system of claim 2, wherein the eyewear article frame further comprises an image generator operable to display an augmented reality image to the user.

4. The system of claim 1, wherein the processor, the thermographic camera, and the optical camera are components of a mobile device.

5. The system of claim 4, wherein the mobile device is a smart phone.

6. The system of claim 1, wherein the processor, the thermographic camera, and the optical camera are components of a desktop computer or a laptop computer.

7. The system of claim 1, wherein the first gesture or the second gesture is a hand gesture.

8. The system of claim 7, wherein the hand gesture is at least one of an open hand gesture, a closed hand gesture, a swipe right, a swipe left, a swipe forward, or a swipe backward.

9. The system of claim 1, wherein the first gesture or the second gesture is a head gesture.

10. The system of claim 9, wherein the head gesture is at least one of a single-eye wink, a two-eye blink, an upward head movement, a downward head movement, a rightward head movement, or a leftward head movement.

11. A system, comprising:
a processor to:
receive an infrared image from a thermographic camera;
receive an optical image from an optical camera;
determine whether a light condition of the optical image is a normal light condition, a low light condition, or a no light condition;
in response to the low light condition or the no light condition:
detect infrared radiation in the infrared image;
define a first readable zone within the infrared image, wherein the first readable zone is a portion of a first field of view that includes an image of a body part of a user;
identify a first gesture made by the user based on the infrared radiation within the first readable zone to obtain first gesture information; and
execute a first gesture recognition command associated with the first gesture information; and
in response to the normal light condition:

define a second readable zone within the optical image associated, wherein the second readable zone is a portion of a second field of view that includes the image of the body part of the user;

identify a second gesture made by the user within the second readable zone using optical recognition to obtain second gesture information; and execute a second gesture recognition command associated with the second gesture information.

12. The system of claim 11, wherein the processor, the thermographic camera, and the optical camera are supported on an eyewear article frame, the eyewear article frame further comprising an image generator operable to display an augmented reality image to the user.

13. The system of claim 11, wherein the processor, the thermographic camera, and the optical camera are components of a mobile device.

14. The system of claim 11, wherein the processor, the thermographic camera, and the optical camera are components of a desktop computer or a laptop computer.

15. The system of claim 11, wherein the gesture is a hand gesture, the hand gesture being at least one of an open hand gesture, a closed hand gesture, a swipe right, a swipe left, a swipe forward, or a swipe backward.

16. The system of claim 11, wherein the gesture is a head gesture, the head gesture being at least one of a single-eye wink, a two-eye blink, an upward head movement, a downward head movement, a rightward head movement, or a leftward head movement.

17. A non-transitory computer-readable medium storing instructions to cause a processing device to:

receive an infrared image from a thermographic camera;

receive an optical image from an optical camera;

determine whether a light condition of the optical image is a normal light condition, a low light condition, or a no light condition;

in response to the low light condition or the no light condition:

detect infrared radiation in the infrared image;

define a first readable zone within the infrared image, wherein the first readable zone is a portion of a field of view that includes an image of a body part of a user;

identify a first gesture made by the user based on the infrared radiation within the first readable zone to obtain first gesture information; and execute a first gesture recognition command associated with the first gesture information; and in response to the normal light condition:

define a second readable zone within the optical image associated, wherein the second readable zone is a portion of a second field of view that includes the image of the body part of the user;

identify a second gesture made by the user within the second readable zone using optical recognition to obtain second gesture information; and execute a second gesture recognition command associated with the second gesture information.

18. The non-transitory computer-readable medium of claim 17, wherein the processing device, the thermographic camera, and the optical camera are supported on an eyewear article frame, the eyewear article frame further comprising an image generator operable to display an augmented reality image to the user.

* * * * *